United States Patent [19]

Metzner

[11] Patent Number: 5,070,695
[45] Date of Patent: Dec. 10, 1991

[54] HYDROSTATIC DRIVE SYSTEM

[75] Inventor: Frank Metzner, Wolfsburg, Fed. Rep. of Germany

[73] Assignee: Mannesmann Rexroth GmbH, Lahr, Fed. Rep. of Germany

[21] Appl. No.: 184,948

[22] Filed: Apr. 22, 1988

[30] Foreign Application Priority Data

Apr. 24, 1987 [DE] Fed. Rep. of Germany ....... 3713799

[51] Int. Cl.⁵ ............................................. F16D 31/02
[52] U.S. Cl. ....................................... 60/448; 60/449; 60/452; 60/488; 60/489
[58] Field of Search ................ 60/449, 448, 452, 487, 60/488, 490, 491

[56] References Cited

U.S. PATENT DOCUMENTS

| 4,103,489 | 8/1978 | Fletcher et al. | 60/449 X |
| 4,510,750 | 4/1985 | Izumi et al. | 60/452 X |
| 4,689,956 | 9/1987 | Hein | 60/449 |
| 4,726,187 | 2/1988 | Reinhardt et al. | 60/448 |
| 4,747,268 | 5/1988 | Reinhardt | 60/484 X |

FOREIGN PATENT DOCUMENTS

| 2049048 | 10/1970 | Fed. Rep. of Germany . |
| 2062368 | 12/1970 | Fed. Rep. of Germany . |
| 2739968 | 9/1977 | Fed. Rep. of Germany . |
| 2949337 | 12/1979 | Fed. Rep. of Germany . |
| 3441185 | 11/1984 | Fed. Rep. of Germany . |
| 3528096 | 8/1985 | Fed. Rep. of Germany . |
| 3404534 | 9/1985 | Fed. Rep. of Germany ........ 60/449 |

OTHER PUBLICATIONS

DE-Z: ölhydraulik u. pneumatik, 29, 1984, Nr. 11, S.685-688.
DE-Z: o+p ölhydraulik u. pneumatik, 30, 1986, Nr. 9, S.677,678,680-682.
DE-Z: o+p ölhydraulik u. pneumatik, 30, 1986, Nr. 9, S.637-643.
DE-Z: VDI-Z, Bd. 128, 1986, Nr. 21, S.859-864.
DE-Z: Dier Konstrkteur, 1984, H.3, S.26,28.
D-Buch: R. Pfab: Getriebe-Atals Teil II/7, Hydrostatische Getriebe mit rotierenden Motoren, A.G.T. Vierlag Georg Thum, Ludwigsburg, 1967, S.12, U.13.
DE-Z: o+p ölhnydraulik u. pneumatic, 29, 1985, S.526-530.
DE-Z: o+p ölhydraulik u. pneumatik, 30, 1986, Nr. 12, S.909-919.

Primary Examiner—Edward K. Look
Assistant Examiner—Thomas Denion
Attorney, Agent, or Firm—Harness, Dickey & Pierce

[57] ABSTRACT

A hydrostatic drive system consists respectively of an adjustable primary and secondary unit which are connected together via a conduit train with impressed pressure. The volume flow of the primary unit is regulated in dependence upon the impressed pressure and the volume flow of the secondary unit as a function of the speed. To avoid pronounced dropping of the impressed pressure the power of the secondary unit is limited. For this purpose a circuit is provided in which the volume flows of the primary and secondary units are compared. The power limitation intervenes when the volume flow of the secondary unit exceeds the volume flow of the primary unit.

12 Claims, 4 Drawing Sheets

HYDROSTATIC DRIVE SYSTEM

BACKGROUND OF THE INVENTION

The invention relates to a hydrostatic drive system.

Known hydrostatic drive systems consist of a variable displacement pump operating on a constant or variable motor. The pivot angle of the pump is proportional to the motor speed. There is a volume flow coupling between the pump as primary unit and the motor as secondary unit. Load and speed changes of the secondary unit induce a pressure reaction.

In contrast thereto, the invention has a drive system with secondary regulation. The primary unit maintains an impressed pressure in a conduit train via a pressure control. During motor operation the secondary unit withdraws the energy necessary for maintaining the desired speed. During pump operation, energy is driven from the load, for example when braking a vehicle or paying out a load, and fed back into the conduit train. Since motor and pump operation are both possible in either direction of rotation, the system has a four-quadrant operating mode. The secondary regulation comprises a pressure coupling between the primary unit and the secondary unit. The secondary unit a predetermined torque as a function of the impressed pressure and the pivot angle of the secondary unit. The speed of the secondary unit is a function of the magnitude of the load and the pivot angle.

To maintain the impressed pressure it is assumed that the operating state of the primary unit is uncoupled from that of the secondary unit by a hydraulic accumulator connected to the conduit train or that the power of the secondary unit is adapted to that of the primary unit. It is also assumed that not only does the pressure in the conduit train not collapse but that the pressure in the conduit does not drop below a specific tolerance band. If however the pressure regulation of the primary unit reacts too slowly, the accumulator is emptied and the secondary unit requires considerable power. There is a danger that, due to the pressure breakdown in the conduit train, the pressure coupling of the drive system will function as a flow coupling. This not only cancels the advantages of the pressure coupling but also makes the control function impossible because the control of the pivot angle of the secondary unit in the pressure-coupled drive system is opposite to that in a flow-coupled drive system.

The invention is therefore directed to solving the problem of maintaining the impressed pressure within a predetermined tolerance band in the conduit train of the drive system and thus maintaining operation of the drive system in pressure coupling.

SUMMARY OF THE INVENTION

According to the invention the power of the secondary unit, which is governed by the volume flow absorption, can be limited to maintain the pressure difference in the conduit train within a desired tolerance band. The primary unit is a pressure-regulated pump whose drive speed and pivot angle are measured. The volume flow of the primary unit is thus predeterminable, taking into account the volumetric efficiency of the primary unit. In corresponding manner, the speed of rotation and pivot angle of the secondary unit are measured and from this the volume flow of the secondary unit is determined. The volume flows occuring at the two units and the maximum possible volume flows of the two units are then related to each other in such a manner that the pivot angle or speed of the secondary unit is limited when the volume flow absorption of the secondary unit becomes greater than the volume flow furnished by the primary unit. Thus, the pressure in the conduit train can be prevented from dropping below a predetermined value by simple means.

A solution of the problem defined above for a plurality of secondary units connected to the conduit train is set forth herein as well. This also avoids the pressure dropping below a predetermined allowable pressure difference tolerance band.

BRIEF DESCRIPTION OF THE DRAWINGS

The invention will be explained in detail hereinafter with the aid of the drawings, wherein.

DETAILED DESCRIPTION OF THE PREFERRED EMBODIMENTS

Figure 1:
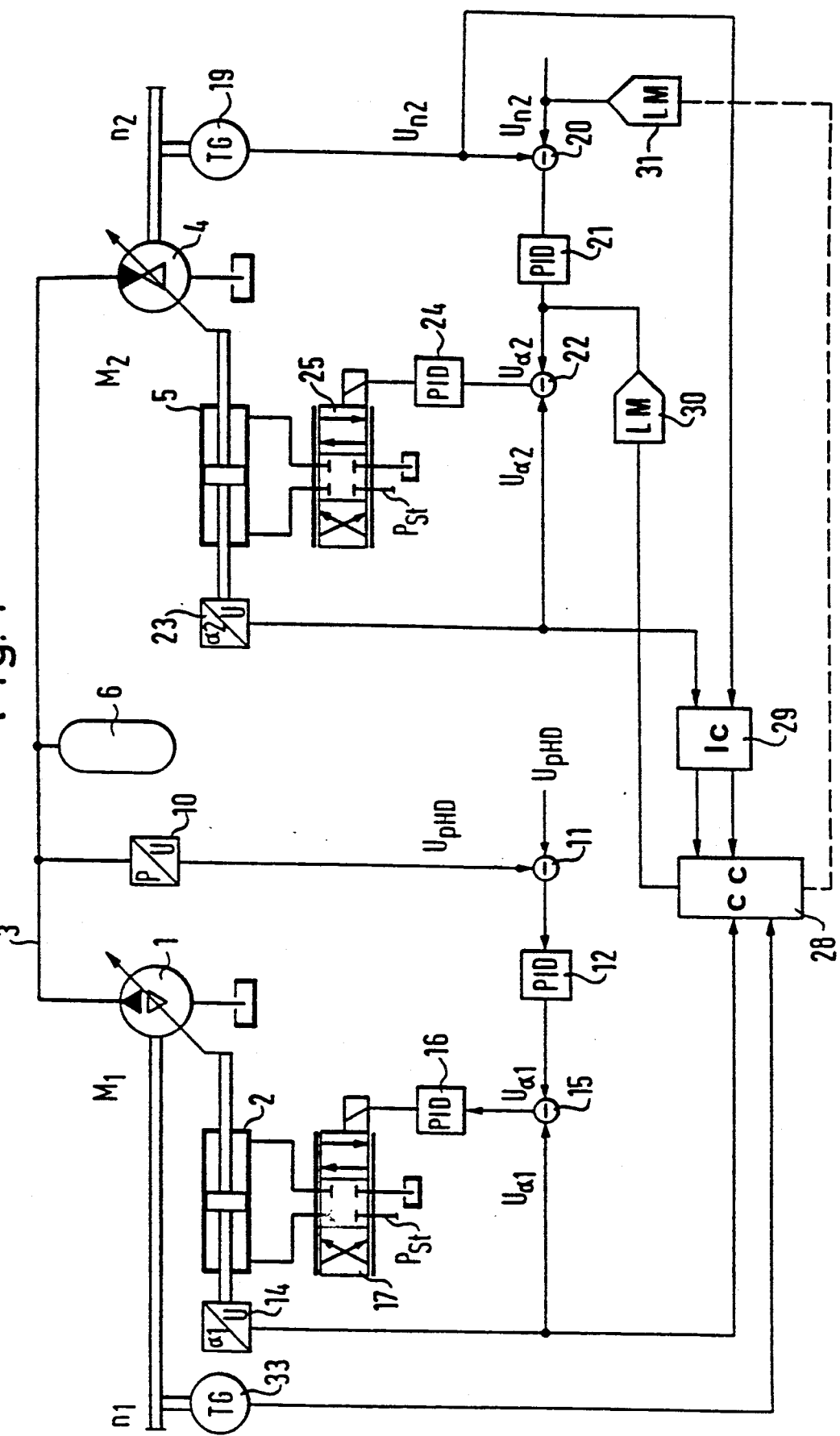
FIG. 1 shows a signal flow plan of the control of the hydrostatic drive system in the embodiment with one secondary unit.

FIG. 1 shows as part of a drive, not illustrated, a first hydrostatic machine 1, for example a reciprocating-piston pump, the actuator of which is adjustable beyond the zero point in both directions and actuated by an adjusting or actuator cylinder 2.

Connected to the machine 1 via a conduit train 3 is second hydrostatic machine 4 as secondary unit, the acytuator of which is likewise adjustable beyond the zero point in both directions. For this purpose an adjusting cylinder 5 is provided. The machine 4 is connected to a load, not illustrated. Connected to the conduit train 3 is an optional accumulator 6 which is not required in the present drive system.

Pressure control or regulation is provided for the primary unit 1 and consists of a pressure pickup 10 connected to the conduit train, a comparison member 11 and a pressure regulator 12 which can be constructed as a PID controller (proportional-integral-differentiating circuit). In cascaded relationship to the pressure control circuit is a pivot angle control circuit which consists of a displacement pickup 14 connected to the adjusting cylinder 2 for determining the pivot angle of the machine 1, a comparison member 15 and a pivot angle regulator 16 which is likewise constructed as PID controller and drives a proportional valve 17 which supplies control fluid $P_{St}$ to or removes fluid from the adjusting cylinder 2 for adjustment thereof.

In the comparison member 11 the difference value is determined from the actual value of the impressed pressure $P_{HD}$ in the conduit train 3 or the pressure difference $\Delta P_{HD}$ occuring at the machine 1 between inlet and outlet and an arbitrarily selectable desired value of the pressure or pressure difference. The output signal of the pressure regulator 12 represents the desired value for the pivot angle $\alpha_1$ of the machine which is compared in the comparison member 15 with the actual value $\alpha_1$ measured by the displacement pickup 14. The difference signal is supplied to the pivot angle regulator 16.

The pivot angle $\alpha_2$ of the secondary unit 4 is set by a speed control circuit which is in cascade relationship with the pivot angle control circuit. The speed control circuit consists of a tachogenerator 19 for the speed $n_2$, a comparison member 20 to which the desired value for the speed $n_2$ is also supplied, and a speed regulator 21. The output signal of the speed regulator represents the desired value for the pivot angle $\alpha_2$ of the machine 4 which is compared in the comparison member 22 with the actual value of the pivot angle which is measured in a displacement pickup 23 connected to the adjusting cylinder 5. The difference signal is supplied to a pivot angle regulator 24 which drives a proportional valve 25 which supplies control fluid $P_{St}$ to and withdraws fluid from the adjusting cylinder 5 for adjustment thereof.

The pivot angle $\alpha_1$ of the primary unit 1 is thus set by a pressure control whilst the pivot angle of the secondary unit 4 is set by a speed control. If the secondary unit is operating as a motor it furnishes a predetermined torque which produces a certain speed depending on the magnitude of the load. The predetermined torque is a function of the setting of its pivot angle and thus the absorption volume of the machine for a given impressed pressure in the conduit train 3.

Figure 2:
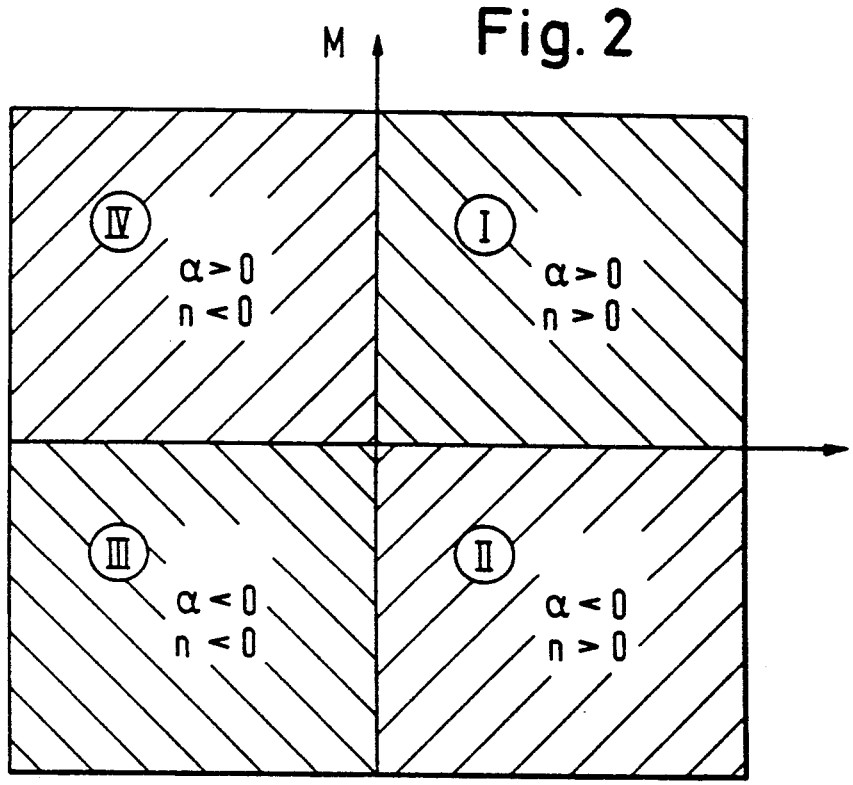
FIG. 2 illustrates the pivot angle and speed of the secondary unit in four-quadrant operation mode.

To limit the power of the secondary unit a computing circuit (CC) 28, an identification circuit (IC) 29 and limiter members (LM) 30 and 31 are provided. The limiter member 30 is connected to the output of the speed regulator 21 and the limiter member 31 is connected to the input of the comparison member 20. The actual value of the pivot angle $\alpha_1$ of the primary unit is supplied to the computing circuit 28, as is the speed $n_1$ of the primary unit which is measured in a tachogenerator 33 or alternatively is known (constant). Furthermore, the actual value of the pivot $\alpha_2$ of the secondary unit and the speed $n_2$ thereof are supplied to the computing circuit. To distinguish the direction of the volume flow in the conduit train 3 the identification circuit 29 is provided. In motor operation of the secondary unit, i.e. with volume flow absorption of the secondary unit, the pressure in the conduit train 3 drops whilst in pump operation and volume flow delivery the impressed pressure increases. The quadrant identification is illustrated in FIG. 2. Accordingly, motor operation exists when the product of the sign of the power parameter pivot angle $\alpha_2$ and speed $n_2$ is greater than zero:

$$\text{sign}(\alpha_2)^*\text{sign}(n_2) > 0 \quad (1)$$

Pump operation is present in contrast and the product of the signs of the two power parameters is less than zero:

$$\text{sign}(\alpha_2)^*\text{sign}(n_2) < 0 \quad (2)$$

Once the quadrant and thus the mode of operation is determined the volume flow absorption $Q_2$ of the secondary unit can be found as.

$$Q_2 = V_2 * \alpha_2 / \alpha_{2max} * n_2 / (\eta_2 * \lambda_2) \quad (3)$$

If it is to be ensured that this lies below the volume flow $Q_1$ delivered by the primary unit, i.e.

$$Q_1 = V_1 * \alpha_1 / \alpha_{1max} * n_1 / (\eta_1 * \lambda_1) \quad (4)$$

then the pivot angle $\alpha_2$ of the secondary unit must be limited in accordance with the following algorithm:

$$Q_2 < Q_1 \quad (5)$$

$$\alpha_2 < \frac{V_{1max}}{V_{2max}} * \frac{\alpha_{2max}}{\alpha_{1max}} * \frac{n_1}{n_2} * \eta_1 * \eta_2 * \lambda_1 * \lambda_2 * K_L * \alpha_1 \quad (6)$$

In these equations:
$\alpha_1$: pivot angle of the primary unit
$\alpha_2$: pivot angle of the secondary unit
$n_1$: speed of the primary unit
$n_2$: speed of the secondary unit
$V_{1max}$: nominal displacement volume of the primary unit
$V_{2max}$: nominal displacement volume of the secondary unit
$\alpha_{1max}$: maximum pivot angle of the primary unit
$\alpha_{2max}$: maximum pivot angle of the secondary unit
$\eta_1$: volumetric efficiency of the primary unit
$\eta_2$: volumetric efficiency of the secondary unit
$\lambda_1$: loss coefficient for the adjustment of the primary unit
$\lambda_2$: loss coefficient for the adjustment of the secondary unit
$K_L$: leakage coefficient of the drive.

To a first approximation a constant K may be defined which combines some of the aforementioned quantities as follows:

$$K = \frac{V_{1max}}{V_{2max}} * \frac{\alpha_{2max}}{\alpha_{1max}} * \eta_1 * \eta_2 * \lambda_1 * \lambda_2 * K_L \quad (7)$$

Summarizing, this therefore gives:

$$\alpha_2 < K * n_1 / n_2 * \alpha_1 \quad (8)$$

The identification circuit 29 which receives as inputs the measured values of the pivot angle $\alpha_2$ and the speed $n_2$ of the secondary unit makes a determination in accordance with FIG. 2 when the product of the two quantities is greater than zero so that a volume flow absorption on the side of the secondary unit occurs. In the computing circuit 28 a determination is made in accordance with the algorithm of equation 8 or equation 6. To fulfil the algorithm the computing circuit 28 furnishes a signal with the aid of which by the limiter member 30 the output signal of the speed regulator 21 is made to follow up, i.e. the output signal of the speed regulator 21 cannot be greater than the particular value predefined by the limiter member 30.

Figure 3:
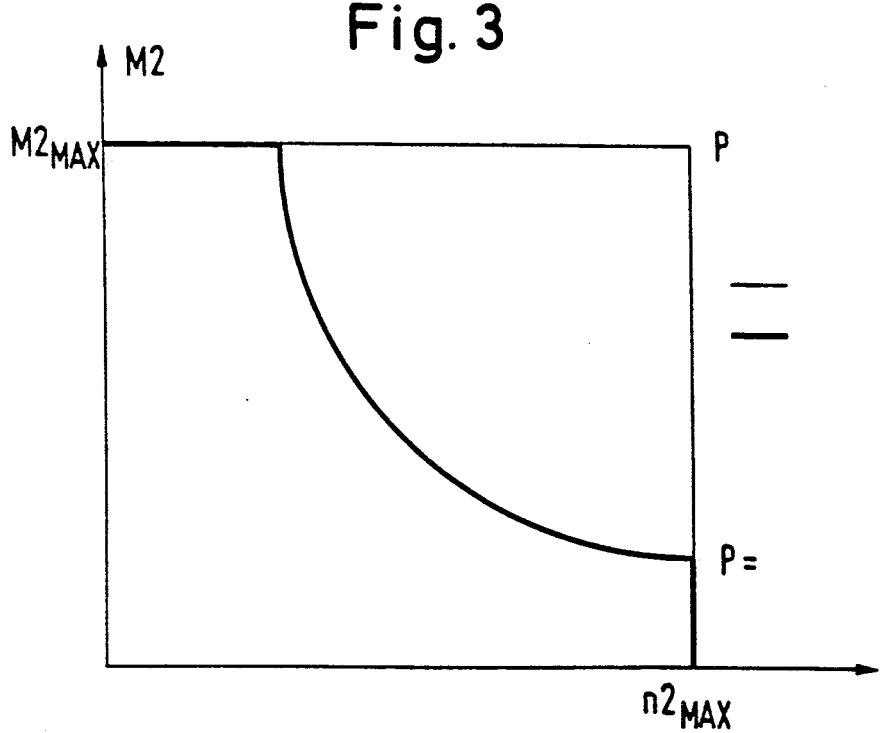
FIG. 3 shows the torque and speed of the secondary unit with power limitation.

This thus gives the torque limitation (thick line) illustrated in FIG. 3 in contrast to a control without power limitation (thin line).

The limitation of the pivot angle $\alpha_2$ via the limiting member 30 is suitable for drives without external load, i.e. for vehicles, slewing gear, centrifuges, rotary platforms, stirring mechanisms, etc. For a drive with external load, for example a winch, the pivot angle $\alpha_2$ of the secondary unit must not be reduced. For this the equation $$n_2 < K * \alpha_1 / \alpha_2 * n_1 \quad (9)$$

applies because the pivot angle is governed by the suspended load of the winch. For this purpose the limiting member 31 is provided which is connected to the desired value input for the speed $n_2$ and limits said desired value so that it cannot become greater than the value defined by the limiting member 31 via the computing circuit 28.

At zero speed of the secondary unit the limiting algorithm according to equation 8 must be bypassed, i.e. in this case the pivot angle limitation is cancelled. This also applies to equation 9 when with a winch no load is suspended. In this case as well the speed limitation must be cancelled.

Figure 4:
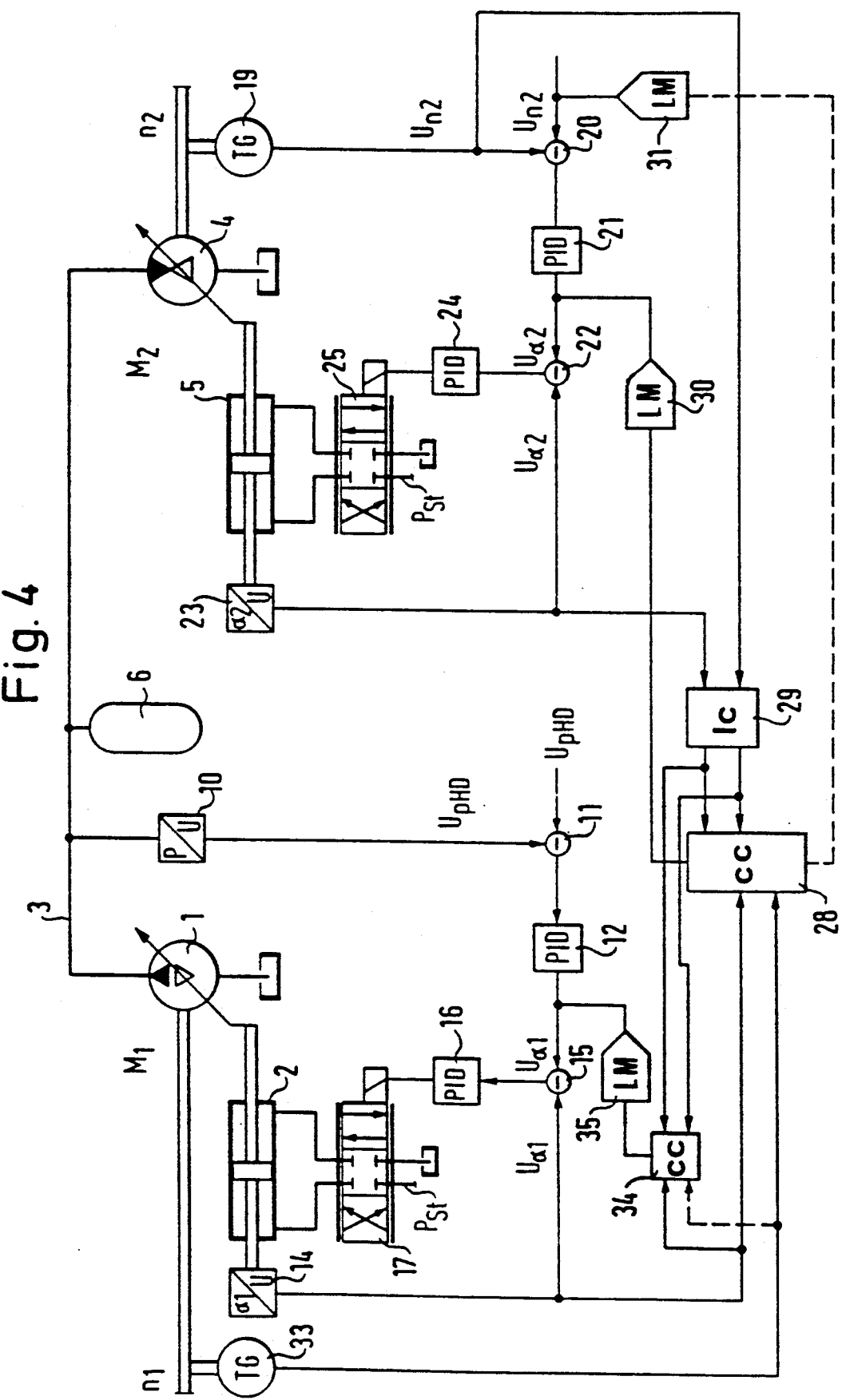
FIG. 4 is a signal flow plan of the control as in FIG. 1 but with additional limitation of the primary power output and FIG. 5 is a signal flow plan of the control of a hydrostatic drive system having a plurality of secondary units.

If the quadrant identification 29 determines pump mode of the secondary unit 4 and delivers fluid to the primary unit 1 then operating as motor, then analogously to the power limitation 28 on the secondary side a primary power limitation (LM) 35 is to become effective with the associated computing circuit (CC) 34 when the engine coupled to the primary unit, which is then operating as generator in brake mode, cannot take the full drive torque, as would be the case with an internal-combustion engine; this is shown in FIG. 4.

The computing circuit 34 includes the requirement of quadrant identification 29 of the secondary unit 4 "pump mode" in accordance with equation (2) and the quadrant identification of the primary unit 1 "motor mode" according to the equation (10):

$$\text{sign}(\alpha_1) < 0 \tag{10}$$

For this purpose only the pivot angle is necessary because the direction of rotation of the primary unit is fundamentally positive. Analogously, equation (8) then applies to the limitation of the pivot angle $\alpha_1$ of the primary unit 1:

$$\alpha_1 < L^* n_2/n_1 {}^* \alpha_2 \tag{11}$$

wherein the constant L is combined analogously to equation (7) to give:

$$L = \frac{V_{2max}}{V_{1max}} \cdot \frac{\alpha_{2max}}{\alpha_{1max}} \cdot \eta_1 \cdot \eta_2 \cdot \lambda_1 \cdot \lambda_2 \cdot K_L \tag{12}$$

If several secondary units are connected to a common conduit train 3 and thus several takeoffs independent of each other are present, for each mechanically independent control unit a pressure control is superimposed. This is shown in FIG. 5.

A computing circuit (cc) 32 is supplied with the desired value and the actual value of the impressed pressure or of the pressure difference at the primary unit as inputs. The computing circuit 32 determines the difference of the two pressure values and compares the difference with an admissible upper and lower value defining a tolerance band. If the pressure difference between the desired value and the actual value drops below the predetermined tolerance band the computing circuit 32 furnishes an output signal which reduces the volume flow absorption of each secondary unit by the same amount. To avoid intervention of the power limitation on brief pressure fluctuations a timing stage is provided in the computing circuit 32 so that the pressure must drop below the predetermined tolerance band for a predetermined period of time, whereupon the power limitation takes place.

Figure 5:
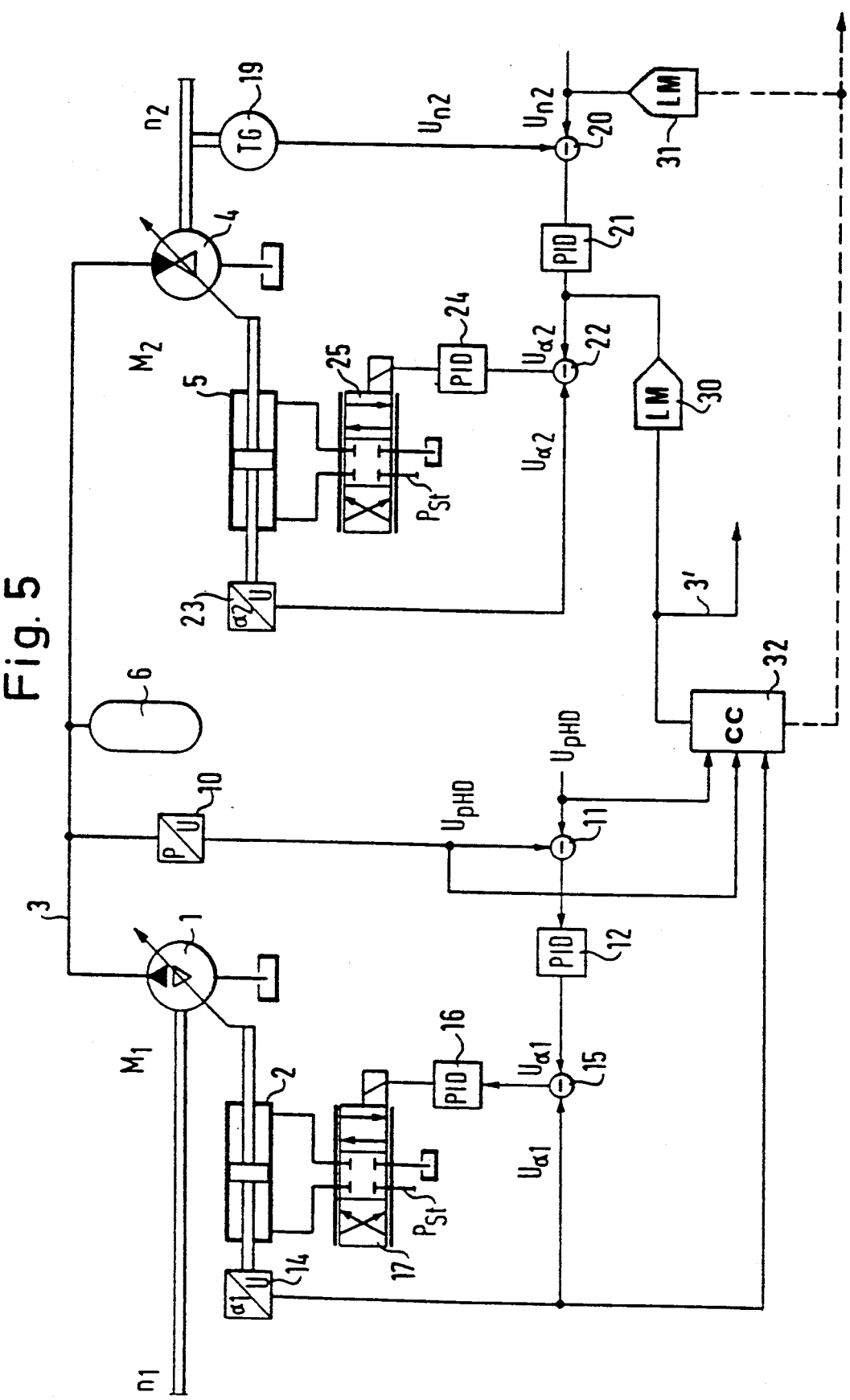

Otherwise the signal flow plan of FIG. 5 corresponds completely to the signal flow plan of FIG. 1. As indicated at 3' to the conduit train 3 a second or more secondary units are connected, which are not illustrated in detail. As already mentioned concerning FIG. 1 the computing circuit 32 limits the pivot angle $\alpha_2$ of the individual secondary units when drives without external load are involved whilst the desired speed $n_2$ is limited when drives with external load, for example winches, are involved.

Furthermore, the actual value of the pivot angle $\alpha_1$ of the primary unit may be supplied as additional input quantity to the computing circuit 32. If the pivot angle $\alpha_1$ exceeds a predetermined threshold value the volume flow absorption of all the secondary units is reduced by the same amount. This step is intended in particular as a precautionary step to reduce in sufficient time the danger of a sudden pressure collapse.

I claim:

1. Drive system comprising a primary unit having a first adjustable hydrostatic machine operable as a pump or a motor and when operating as pump conveys fluid into a conduit train under pressure, a secondary unit in communication with said conduit train and comprising a second adjustable hydrostatic machine coupled to a load and operable as a pump or a motor and when operating as motor withdraws fluid from said conduit train and when operating as pump conveys fluid under pressure to said primary unit for operating said primary unit as motor, said primary unit including a primary directional control valve for actuating an adjusting cylinder of said primary unit for setting the pivot angles of said primary hydrostatic machines, said adjusting cylinder of the primary unit being adjustable by means of a control flow dependent on the pressure in the conduit train, said secondary unit including a secondary directional control valve for actuating an adjusting cylinder of said secondary unit for setting the pivot angle of said secondary hydrostatic machine, said adjusting cylinder of said secondary unit being adjustable by means of a control flow dependent on a speed of rotation thereof, an electrical pressure pickup for measuring pressure in said conduit train, a pressure comparison stage for a desired value and an actual value of the pressure, said primary valve controlled by said pressure comparison stage of said adjusting cylinder of said primary unit for regulation of the pressure in said conduit train, an electrical tachogenerator for measuring the speed of said secondary unit, a speed comparison stage of a desired value and an actual value of the speed of rotation, said secondary valve being controlled by said speed comparison stage for said adjusting cylinder of the secondary unit for the speed of regulation of the secondary unit, and means for limiting one of the power of the said secondary unit and the speed of the secondary unit by reducing the pivot angle of said secondary unit for reducing volume of the secondary unit below the primary unit in response to one of measured values of the pivot angles of said primary and secondary units and speed of said primary and secondary units.

2. Drive systems according to claim 1, further comprising means for determining the volume flow of the secondary unit in dependence upon the direction of rotation and the operation of the secondary unit as a motor or pump.

3. Drive system according to claim 1 wherein the speed of the secondary unit is reduced by employing a limited circuit whose output signal limits the output signal of a speed regulator of the secondary unit.

4. Drive system according to claim 1 for drives with external load, characterized in that a limiter circuit is provided whose output signal limits the desired value of the input signal of a speed regulator of the secondary unit.

5. Drive system according to claim 1 characterized in that a pivot angle control circuit is cascaded with a speed control circuit of the secondary unit.

6. Drive system according to claim 1 characterized in that a pivot angle control circuit is cascaded with a pressure control circuit of the primary unit.

7. Drive system according to claim 5 wherein a displacement pickup is provided for each adjusting cylinder for measuring the pivot angle and further that the displacement pickups and the one of the primary valve and the secondary valve are connected via a comparison member to a pivot angle regulator for the secondary unit.

8. Drive system according to claim 1 wherein the means of limiting limits the power of the secondary unit and is a computing circuit having an output signal determined in accordance with the following relationship $$K \frac{n_1}{n_2} \cdot \frac{1}{2}$$

wherein $$K = k \frac{V_{1max}}{V_{2max}} \cdot \frac{a_{2max}}{a_{2max}}$$

and either $$a_2 < K \frac{n_1}{n_2} \cdot a_1$$

in one of the limiters or $$n_2 < K \frac{a_1}{a_2} \cdot n_1$$

in the other of the limiters.

9. Drive system comprising a primary unit comprising a first adjustable hydrostatic machine driven by a motor and operable as a pump or a motor and which when operating as pump conveys fluid into a conduit train under pressure, a secondary unit comprising a plurality of second adjustable hydrostatic machines communicating with said conduit train and each coupled to a load, said second hydrostatic machines each being operable either as a motor or a pump and when operating as motor withdraw fluid from said conduit train and when operating as pump convey fluid to said primary unit to operate said first machine as motor, and a respective directional control valve for actuating adjusting cylinders of each of said second hydrostatic machine for setting the pivot angles of the respective hydrostatic machines, the adjusting cylinder of the primary unit being adjustable by means of a control flow dependent on the pressure in the conduit train, the adjusting cylinders of the second hydrostatic machines being adjustable by means of a control flow dependent on the speed of rotation thereof, an electrical pressure pickup for sensing the pressure in said conduit train, a comparison stage for the desired value and actual value of the pressure in the conduit train and a valve electrically driven by said comparison stage for the adjusting cylinder of said primary unit for regulation of the pressure in said conduit train, an electrical tachogenerator for each of said second hydrostatic machines, a second comparison stage for the desired value and actual value of the speed of rotation of said second hydrostatic machines and a valve electrically driven by said second comparison stage for the adjusting cylinders of said second hydrostatic machines for the speed regulation of said hydrostatic machines, characterized in that the power of said second hydrostatic machines is limited in response to the difference of the actual value and desired value of the impressed pressure and when a predetermined difference is exceeded the pivot angle and the speed of all said second hydrostatic machines is reduced by the same amount.

10. Drive system according to claim 9, characterized in that the reduction of the volume flows of the secondary units takes place after expiry of a predetermined time of the predetermined pressure difference.

11. Drive system according to claim 9, characterized in that when the pivot angle of the primary unit exceeds a predetermined threshold value of the speed of rotation of all the secondary units is reduced by the same amount.

12. Drive system according to claims 9, characterized in that for power limitation of the primary unit in pump operation of the secondary unit the pivot angle of the primary unit is reduced in a computing circuit in accordance with the relationship $$a_1 < L \cdot \frac{n_2}{n_1} \cdot a_2$$

with $L = \frac{V_{2max}}{V_{1max}} \cdot \frac{a_{2max}}{a_{1max}} \cdot \eta_1 \cdot \eta_2 \cdot \lambda_1 \cdot \lambda_2 \cdot K_L$

* * * * *